(12) United States Patent
Asada et al.

(10) Patent No.: US 8,395,738 B2
(45) Date of Patent: Mar. 12, 2013

(54) LIQUID CRYSTAL DISPLAY DEVICE

(75) Inventors: Satoshi Asada, Kanazawa (JP);
Takaharu Ogino, Ishikawa-gun (JP)

(73) Assignee: Japan Display Central Inc., Saitama (JP)

( * ) Notice: Subject to any disclaimer, the term of this patent is extended or adjusted under 35 U.S.C. 154(b) by 222 days.

(21) Appl. No.: 12/252,119

(22) Filed: Oct. 15, 2008

(65) Prior Publication Data
US 2009/0103034 A1 Apr. 23, 2009

(30) Foreign Application Priority Data

Oct. 17, 2007 (JP) ................................ 2007-270315
Jul. 25, 2008 (JP) ................................ 2008-192495

(51) Int. Cl.
*G02F 1/1343* (2006.01)
(52) U.S. Cl. ......................................... 349/139; 349/59
(58) Field of Classification Search .................. 349/40, 349/59, 139
See application file for complete search history.

(56) References Cited

U.S. PATENT DOCUMENTS

| | | | | |
|---|---|---|---|---|
| 5,929,958 | A | * | 7/1999 | Ohta et al. ..................... 349/141 |
| 6,064,451 | A | * | 5/2000 | Oh et al. ........................ 349/40 |
| 6,888,589 | B2 | * | 5/2005 | Kim et al. ....................... 349/54 |
| 2005/0185105 | A1 | * | 8/2005 | Miyachi et al. ................. 349/24 |
| 2006/0001655 | A1 | * | 1/2006 | Tanabe ........................... 345/176 |
| 2007/0002192 | A1 | * | 1/2007 | Nishino et al. .................. 349/12 |
| 2008/0117372 | A1 | | 5/2008 | Ogino |
| 2009/0180069 | A1 | * | 7/2009 | Nishimura ..................... 349/139 |

FOREIGN PATENT DOCUMENTS

| | | |
|---|---|---|
| JP | 2005-234547 | 9/2005 |
| KR | 1998-014194 | 5/1998 |
| KR | 10-0409251 | 11/2003 |
| KR | 10-2004-0056129 | 6/2004 |
| KR | 10-2007-0092896 | 9/2007 |
| TW | 465253 | 11/2001 |
| TW | 589472 | 6/2004 |
| TW | 594134 | 6/2004 |

OTHER PUBLICATIONS

Official Communication from Korean Patent Office, dated May 24, 2010, issued in counterpart KR Application No. 10-2008-101509 (5 pages).
Office Action issued by the Taiwan Patent Office in Taiwan Patent Application No. 097139945, dated Jul. 30, 2012.

* cited by examiner

*Primary Examiner* — Eric Wong
(74) *Attorney, Agent, or Firm* — Finnegan, Henderson, Farabow, Garrett & Dunner, L.L.P.

(57) ABSTRACT

A liquid crystal display device includes an array substrate, a counter-substrate which is disposed to be opposed to the array substrate, a liquid crystal layer which is formed of a liquid crystal material which is held between the array substrate and the counter-substrate, and a sealant which bonds the array substrate and the counter-substrate. The array substrate includes a pixel electrode having a slit, and a counter-electrode which is opposed to the pixel electrode via an interlayer insulation film. The counter-substrate has a shield electrode on an outer surface thereof. The shield electrode is disposed such that an end portion thereof along at least one side of the counter-substrate, is exposed on the outer surface of the counter-substrate.

6 Claims, 10 Drawing Sheets

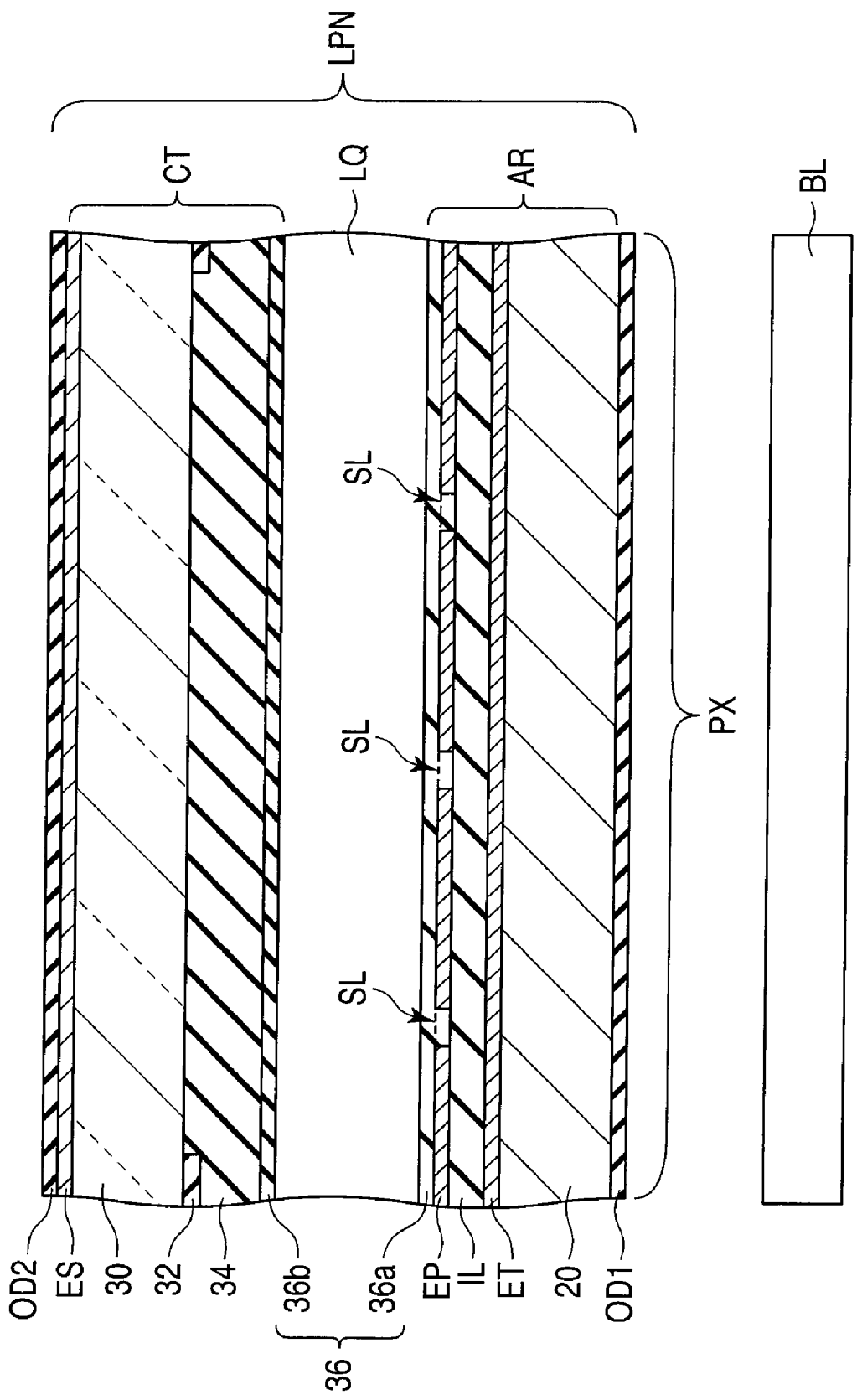
F I G. 3

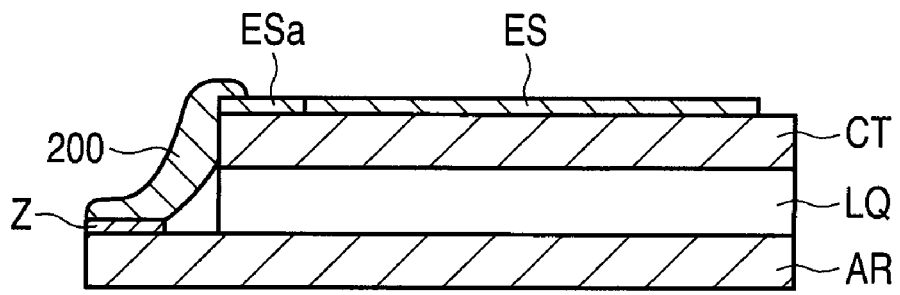
F I G. 5A
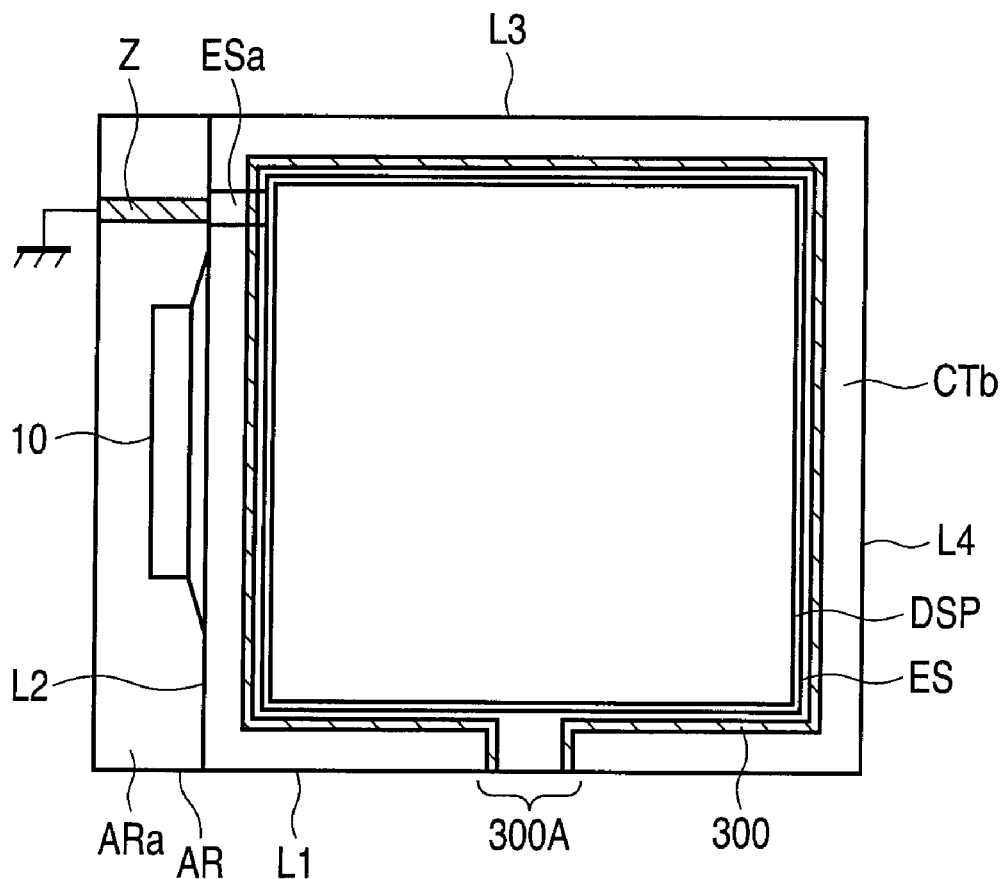
F I G. 5B

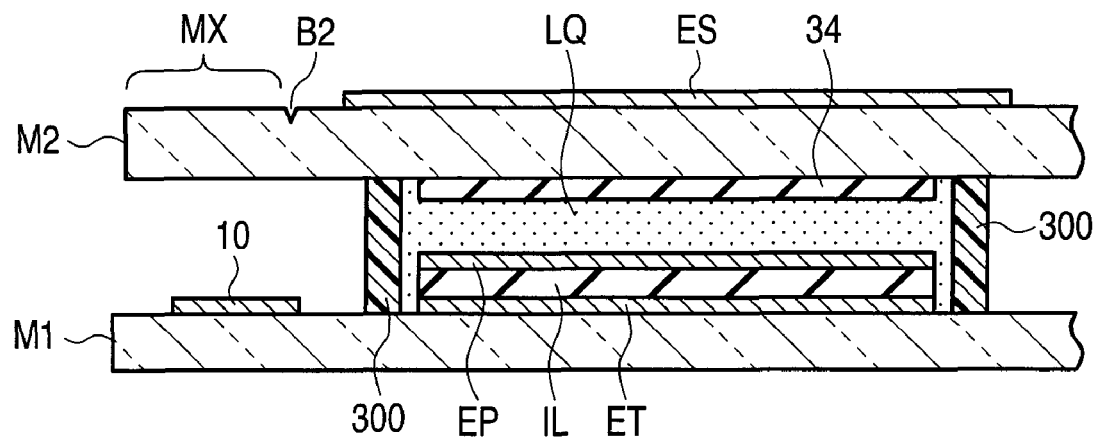
F I G. 10
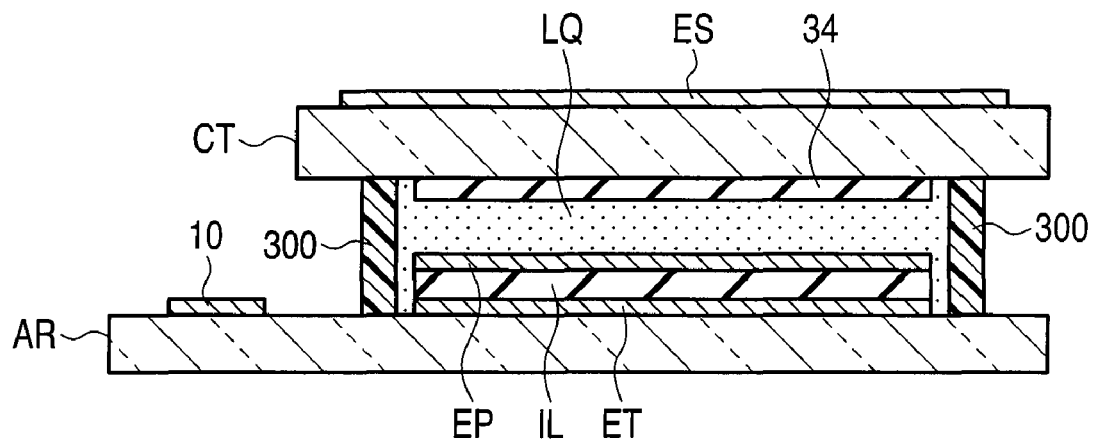
F I G. 11

LIQUID CRYSTAL DISPLAY DEVICE

CROSS-REFERENCE TO RELATED APPLICATIONS

This application is based upon and claims the benefit of priority from prior Japanese Patent Applications No. 2007-270315, filed Oct. 17, 2007; and No. 2008-192495, filed Jul. 25, 2008, the entire contents of both of which are incorporated herein by reference.

BACKGROUND OF THE INVENTION

1. Field of the Invention

The present invention relates generally to a liquid crystal display device, and more particularly to a liquid crystal display device which is configured to have a pixel electrode and a counter-electrode on one of substrates that constitute a liquid crystal display panel.

2. Description of the Related Art

In recent years, flat-panel display devices, which take the place of CRT displays, have vigorously been developed, and liquid crystal display devices, above all, have attracted attention because of advantages of light weight, small thickness and low power consumption. In particular, in an active matrix liquid crystal display device in which a switching element is provided in each of pixels, attention has been paid to the structure which makes use of a transverse electric field (including a fringe electric field) of an IPS (In-Plane Switching) mode or an FFS (Fringe Field Switching) mode.

The liquid crystal display device of the IPS mode or FFS mode includes a pixel electrode and a counter-electrode which are formed on an array substrate, and liquid crystal molecules are switched by a transverse electric field that is produced between the pixel electrode and the counter-electrode and is substantially parallel to the major surface of the array substrate. In addition, polarizer plates, which are disposed such that their axes of polarization intersect at right angles, are disposed on the outer surfaces of the array substrate and the counter-substrate. By this disposition of the polarizer plates, a black screen is displayed, for example, at a time of non-application of voltage. With the application of a voltage corresponding to a video signal to the pixel electrode, the light transmittance (modulation ratio) gradually increases and a white screen is displayed.

In this liquid crystal display device, if the counter-substrate is charged with, e.g. static electricity, a vertical electric field is produced between the counter-substrate and the array substrate. If the vertical electric field is produced, an alignment defect of liquid crystal molecules occurs, leading to degradation in display quality. In order to prevent charging of the counter-substrate, there has been disclosed a technique in which a shield electrode is disposed on the outer surface or inner surface of the counter-substrate (see Jpn. Pat. Appln. KOKAI Publication No. 2005-234547).

In the IPS more or FFS mode liquid crystal display device, the thickness of the liquid crystal layer is relatively small. Thus, in the case where the shield electrode is disposed on the inner surface of the counter-substrate, the shield electrode is positioned close to the counter-electrode and pixel electrode. Consequently, a vertical electric field, which occurs between the shield electrode, on the one hand, and the counter-electrode and pixel electrode, on the other hand, may cause an alignment defect of liquid crystal molecules and degradation in display quality.

On the other hand, as regards the structure in which the shield electrode is disposed on the outer surface of the counter-substrate, in the case where the shield electrode is formed in a solid fashion on the outer surface of a mother-substrate which becomes the counter-substrate, a part of the shield electrode may possibly peeled off when the counter-substrate of a predetermined size is cut out of the mother-substrate, and the peeled matter may become minute electrically conductive foreign matter and contaminate the surrounding.

For example, if a mounting section for connecting wiring on the array substrate and a signal supply source such as a driving IC is contaminated, a problem, such as short-circuit between terminals, may occur. This may cause degradation in display quality and reliability of the liquid crystal display device, and a decrease in manufacturing yield.

Moreover, in the structure in which a liquid crystal material is vacuum-injected, if the area of an injection port is contaminated, electrically conductive foreign matter would be drawn and mixed in the liquid crystal layer at the time of injecting the liquid crystal material. Such electrically conductive foreign matter may become a factor which causes short-circuit between wiring lines or electrodes, and an alignment defect of liquid crystal molecules. Hence, the display quality of the liquid crystal display device may be degraded, and the manufacturing yield may be lowered.

BRIEF SUMMARY OF THE INVENTION

The present invention has been made in consideration of the above-described problems, and the object of the invention is to provide a liquid crystal display device which can suppress charging of a counter-substrate and can improve the display quality and manufacturing yield.

According to a first aspect of the present invention, there is provided a liquid crystal display device comprising: a first substrate; a second substrate which is disposed to be opposed to the first substrate; a liquid crystal layer which is formed of a liquid crystal material which is held between the first substrate and the second substrate; and a sealant which bonds the first substrate and the second substrate, wherein the second substrate has a shield electrode on an outer surface thereof, and the shield electrode is disposed such that an end portion thereof along at least one side of the second substrate, is exposed on the outer surface of the second substrate.

According to a second aspect of the present invention, there is provided a liquid crystal display device which is formed by a method comprising: a step of forming a mounting section and a first display element section on one surface of a first substrate; a step of forming a second display element section on one surface of a second substrate; a step of forming, on the other surface of the second substrate, a shield electrode, which is opposed to the second display element section, without overlap on a cutting line; a step of coating a sealant in a manner to surround the first display element section or the second display element section; a step of bonding the first substrate and the second substrate such that the first display element section and the second display element section face each other; and a step of cutting an area of the second substrate, which is opposed to the mounting section, along the cutting line, wherein the shield electrode is disposed such that an end portion thereof along at least one side of the second substrate, is exposed on the other surface of the second substrate.

The present invention can provide a liquid crystal display device which can suppress charging of a counter-substrate and can improve the display quality and manufacturing yield.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a cross-sectional view that schematically shows the structure of an array substrate and a counter-substrate, which is applied to the liquid crystal display device shown in FIG. 1;

FIG. 5A is a cross-sectional view that schematically shows the structure of an array substrate and a counter-substrate in Example 2;

FIG. 5B schematically shows the structure of a liquid crystal display device in Example 2;

FIG. 10 is a view for describing a step of forming a scribe surface in order to remove a region of the second mother-substrate, which is opposed to a mounting section;

FIG. 11 is a cross-sectional view that schematically shows the structure of a liquid crystal display device which is formed through the steps of FIG. 8 to FIG. 10.

DETAILED DESCRIPTION OF THE INVENTION

A liquid crystal display device according to an embodiment of the present invention will now be described with reference to the accompanying drawings.

An FFS mode liquid crystal display device is described below as an example of a liquid crystal display device of a liquid crystal mode in which a pair of electrodes, namely, a pixel electrode and a counter-electrode, are provided on one of substrates, and liquid crystal molecules are switched by using a transverse electric field that is produced between these electrodes.

Figure 1:
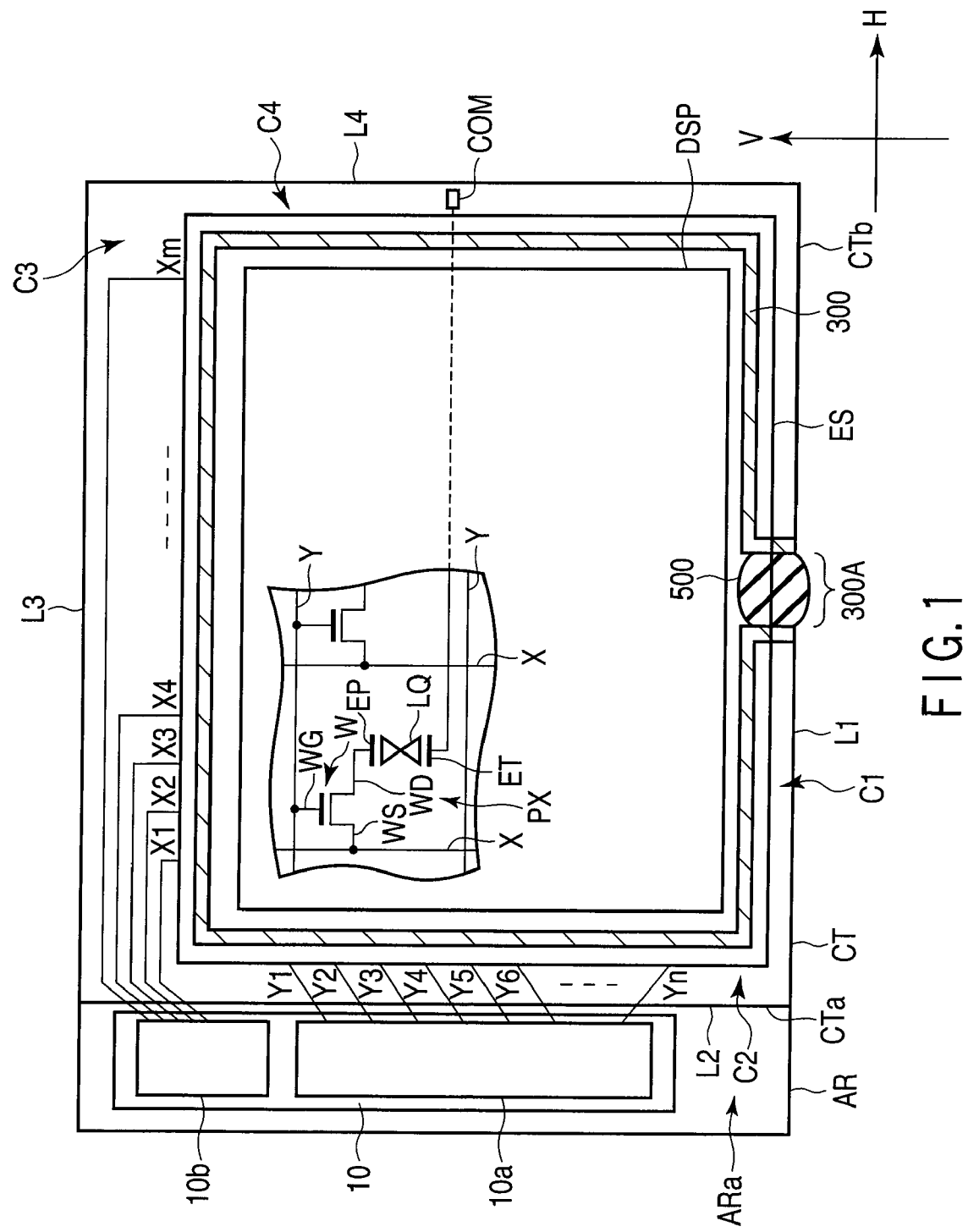
FIG. 1 schematically shows the structure of a liquid crystal display device of a liquid crystal mode which makes use of a transverse electric field according to an embodiment of the present invention.
Figure 2:
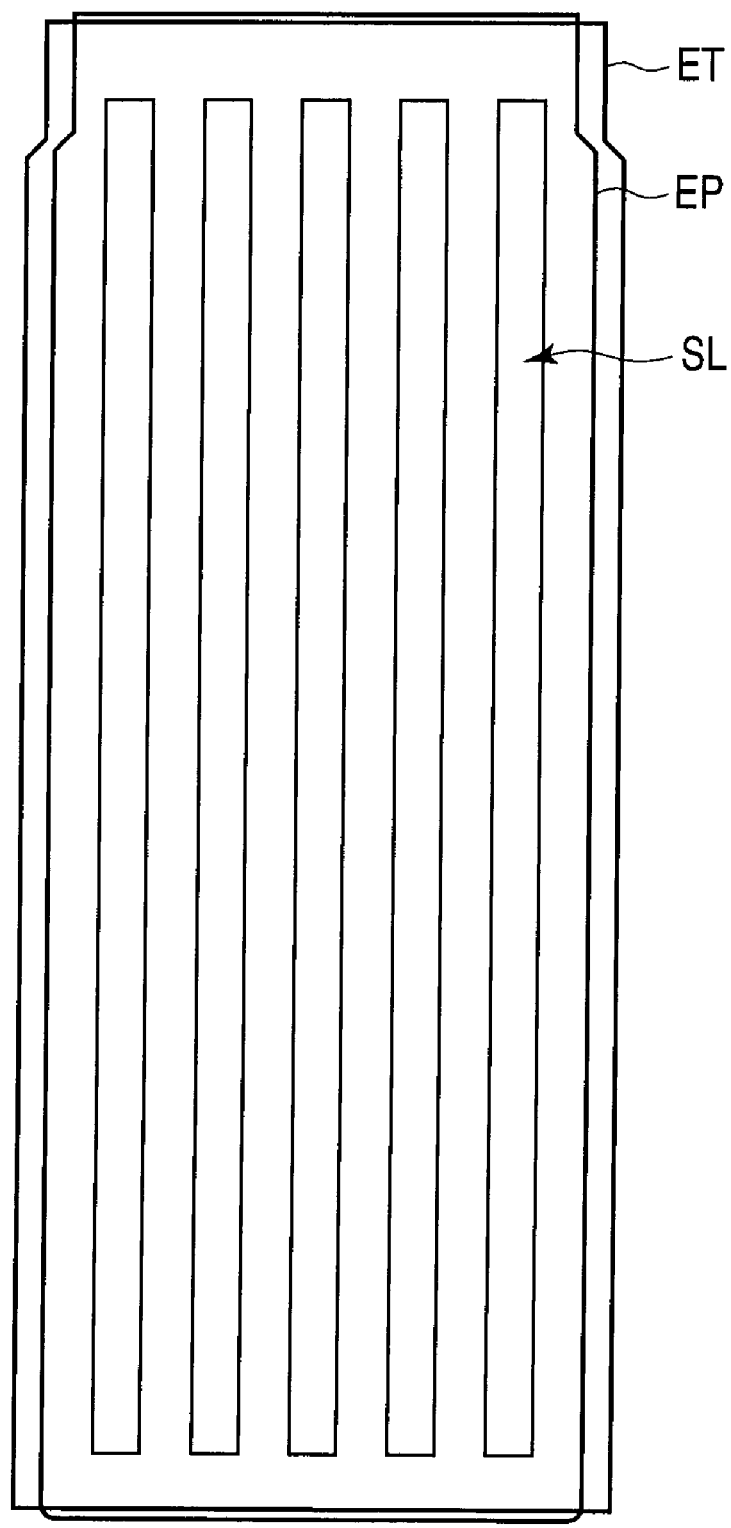
FIG. 2 is a plan view that schematically shows the structure of a pixel electrode and a counter-electrode of one pixel, which is applied to the liquid crystal display device shown in FIG. 1.

As is shown in FIG. 1, FIG. 2 and FIG. 3, the liquid crystal display device is an active matrix type liquid crystal display device, and includes a liquid crystal display panel LPN. The liquid crystal display panel LPN includes an array substrate (first substrate) AR, a counter-substrate (second substrate) CT which is disposed to be opposed to the array substrate AR, and a liquid crystal layer LQ which is held between the array substrate AR and the counter-substrate CT. The array substrate AR and the counter-substrate CT are attached by a sealant 300. The sealant 300 is disposed in a manner to surround a display area DSP. In the example shown in FIG. 1, the sealant 300 is disposed so as to secure an injection port 300A for injecting a liquid crystal material. The injection port 300A is sealed by an end-sealing material 500 which is formed of, e.g. photosensitive resin. The display area DSP is composed of a plurality of pixels PX which are arrayed in a matrix of m×n.

The array substrate AR is formed by using an insulating substrate 20 with light transmissivity, such as a glass plate or a quartz plate. Specifically, the array substrate AR includes, in the display area DSP, an (m×n) number of pixel electrodes (second electrodes) EP which are disposed in association with the respective pixels PX; an n-number of scanning lines Y (Y1 to Yn) which extend in a row direction H of the pixels PX; an m-number of signal lines X (X1 to Xm) which extend in a column direction V of the pixels PX; an (m×n) number of switching elements W which are disposed in regions including intersections between the scanning lines Y and signal lines X in the respective pixels PX; and a counter-electrode (first electrode) ET which is disposed to be opposed to the pixel electrodes EP via an interlayer insulation film IL.

The array substrate AR further includes a mounting section 10 on the outside of the display area DSP. Specifically, the array substrate AR includes an extension portion ARa which extends outward from an end side CTa (L2) of the counter-substrate CT. The mounting section 10 is disposed on a surface side of the extension portion ARa (i.e. on a side on which the pixel electrode ER, etc. are disposed). A signal supply source, such as a driving IC including a gate driver 10a and a source driver 10b, is mounted on the mounting portion 10.

The gate driver 10a is electrically connected to the n-number of scanning lines Y, and supplies a scanning signal for driving the pixels PX in the display area DSP. The source driver 10b is electrically connected to the m-number of signal lines X, and supplies video signals, which are written in the pixels PX in the display area DSP, at a timing when the switching elements W of each row are turned on by the scanning signal. Thereby, the pixel electrodes EP of each row are set at pixel potentials corresponding to the video signals that are supplied via the associated switching elements W.

Each of the switching elements W is composed of, e.g. a thin-film transistor. A semiconductor layer of the switching element W can be formed of, e.g. polysilicon or amorphous silicon. A gate electrode WG of the switching element W is connected to the scanning line Y (or formed integral with the scanning line Y). A source electrode WS of the switching element W is connected to the signal line X (or formed integral with the signal line X) and is put in contact with a source region of the semiconductor layer. A drain electrode WD of the switching element W is connected to the pixel electrode EP (or formed integral with the pixel electrode EP) and is put in contact with a drain region of the semiconductor layer.

The counter-electrode ET is disposed, for example, in an island shape in each of the pixels PX, and is electrically connected to a common wiring line COM to which a common potential is supplied. The interlayer insulation film IL is disposed on the counter-electrode ET. The pixel electrode EP is disposed on the interlayer insulation film IL. The pixel electrode EP is disposed in the island shape so as to be opposed to the counter-electrode ET in each pixel PX. The pixel electrode EP is provided with a plurality of slits SL which are opposed to the counter-electrode ET. The pixel electrode EP and counter-electrode ET are formed of a light-transmissive electrically conductive material such as indium tin oxide (ITO) or indium zinc oxide (IZO).

That surface of the array substrate AR, which is in contact with the liquid crystal layer LQ, is covered with an alignment film 36a.

On the other hand, the counter-substrate CT is formed by using an insulating substrate 30 with light transmissivity, such as a glass plate or a quartz plate. Specifically, in a color-display-type liquid crystal display device, as shown in FIG. 3, the counter-substrate CT includes a black matrix 32, which divides the pixels PX, and a color filter layer 34 which is disposed in each pixel PX which is surrounded by the black matrix 32, on an inner surface of the insulating substrate 30 (i.e. a surface opposed to the liquid crystal layer LQ). In addition, the counter-substrate CT may be configured to include an overcoat layer which is disposed with such a relatively large film thickness as to planarize irregularities on the surface of the color filter layer 34.

The black matrix 32 is disposed on the insulating substrate 30 so as to be opposed to the scanning lines Y and signal lines X and wiring portions of the switching elements W, etc., which are provided on the array substrate AR. The color filter layer 34 is disposed on the insulating substrate 30 and is formed of color resins of different colors, for example, the three primary colors of red, blue and green. The red color resin, blue color resin and green color resin are disposed in association with the red color pixel, blue color pixel and green color pixel, respectively. The color filter layer 34 may be disposed on the array substrate AR side.

That surface of the counter-electrode CT, which is in contact with the liquid crystal layer LQ, is covered with an alignment film 36b.

The counter-substrate CT includes a shield electrode ES on an outer surface thereof (i.e. a surface opposite to the liquid crystal layer LQ side surface). In this example, the shield electrode ES is disposed on the outer surface of the insulating substrate 30. The shield electrode ES is formed of a light-transmissive, electrically conductive material such as ITO or IZO.

The above-described counter-substrate CT and array substrate AR are disposed such that their alignment films 36a and 36b are opposed to each other. At this time, a predetermined gap is created by spacers (not shown) between the array substrate AR and counter-substrate CT. The liquid crystal layer LQ is formed of a liquid crystal composition including liquid crystal molecules which are sealed in the gap that is created between the alignment film 36a of the array substrate AR and the alignment film 36b of the counter-substrate CT.

The liquid crystal display device includes an optical element OD1 which is provided on one of outer surfaces of the liquid crystal display panel LPN (i.e. that surface of the array substrate AR, which is opposite to the surface thereof that is in contact with the liquid crystal layer LQ), and an optical element OD2 which is provided on the other outer surface of the liquid crystal display panel LPN (i.e. that surface of the counter-substrate CT, which is opposite to the surface thereof that is in contact with the liquid crystal layer LQ). Each of the optical elements OD1 and OD2 includes a polarizer plate.

The optical element OD1 is directly attached to the insulating substrate 20. The optical element OD2 is attached to the shield electrode ES.

With this structure, backlight from a backlight unit BL, which is disposed on the array substrate AR side of the liquid crystal display panel LPN, is selectively passed through the liquid crystal display panel LPN, and an image is displayed.

A detailed description is now given of the shield electrode ES which is disposed on the outer surface of the counter-substrate CT. The shield electrode ES is disposed so as to cover at least the entire display area DSP. In this case, the shield electrode ES is formed in a substantially rectangular shape with a size which is equal to or greater than the size of the display area DSP, in accordance with the substantially rectangular display area DSP. The shield electrode ES is disposed on the outer surface of the counter-substrate CT in such a manner as to expose an end portion along at least one side of the counter-substrate CT. In the example shown in FIG. 1, the shield electrode ES is disposed in a manner to expose end portions C1, C2, C3 and C4 along the four sides L1, L2, L3 and L4 of the counter-substrate CT.

In this manner, the shield electrode ES is interposed between the second optical element OD2 and the insulating substrate 30 that constitutes the counter-substrate CT. Thereby, even in the case where the second optical element OD2 is charged, the charge can be dispersed and the charging of the counter-substrate CT can be suppressed. In addition, since the shield electrode ES is disposed so as to cover the display area DSP, an external electric field toward the display area DSP can be shielded. Therefore, an undesired vertical electric field is not produced between the array substrate AR and the counter-substrate CT, and the display quality can be improved.

Next, Example 1 and Example 2 of the invention are described.

Figure 4A:
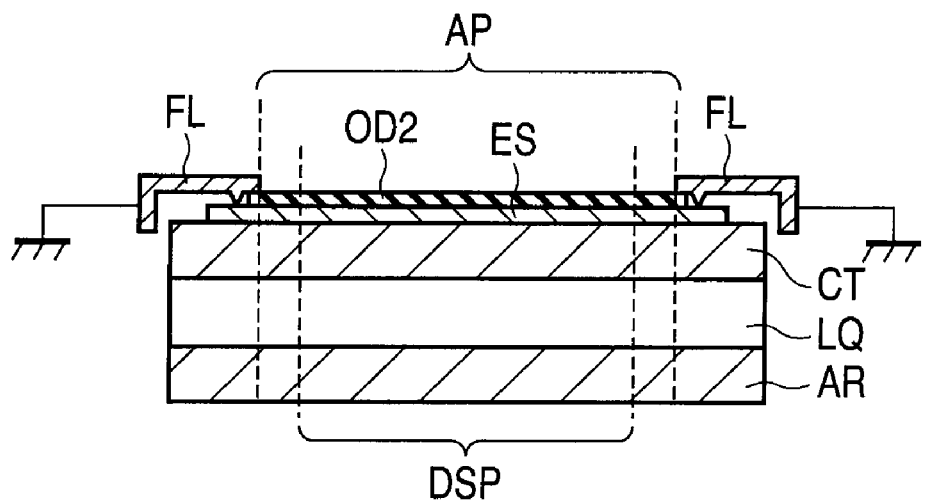
FIG. 4A is a cross-sectional view that schematically shows the structure of an array substrate and a counter-substrate in Example 1.
Figure 4B:
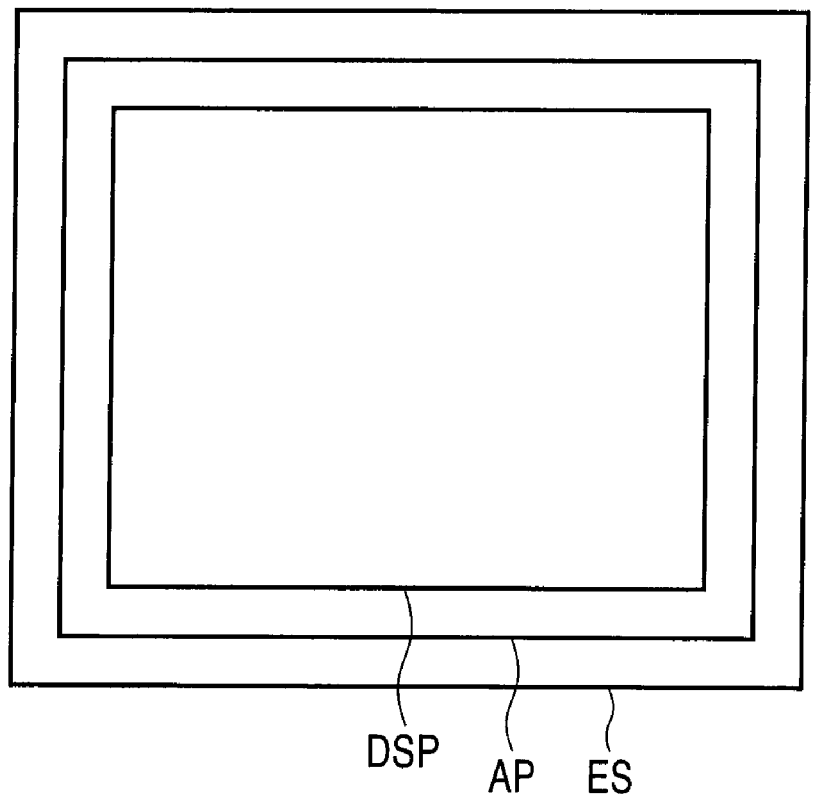
FIG. 4B is a plan view that schematically shows the structure of a shield electrode and a metal frame in Example 1.

In Example 1, as shown in FIG. 4A and FIG. 4B, the shield electrode ES is formed to have a larger size than the display area DSP. The shield electrode ES is disposed so as to cover the display area DSP. In addition, the shield electrode ES is formed to have a smaller size than the counter-substrate CT. In particular, in this example, the array substrate AR and the counter-substrate CT, which constitute the liquid crystal display panel LPN, are formed in a rectangular shape. Like the embodiment shown in FIG. 1, the shield electrode ES is disposed on the outer surface of the counter-substrate CT in a manner to expose end portions (i.e. outer peripheral parts of the outer surface of the insulating substrate 30) along the four sides of the counter-substrate CT.

The liquid crystal display device further includes a frame-shaped metal frame FL which covers the liquid crystal display panel LPN from the outside of the counter-substrate CT. The metal frame FL has a rectangular aperture portion AP which is larger than the rectangular display area DSP and exposes the display area DSP. The aperture portion AP is formed to have a smaller size than the shield electrode ES. The second optical element OD2 is formed to have a smaller size than the shield electrode ES and is disposed so as to expose a part of the shield electrode ES.

Specifically, the metal frame FL is disposed to surround the display area DSP and overlaps a peripheral part of the shield electrode ES (i.e. a part exposed from the second optical element OD2). The metal frame FL has a projection on its inner surface opposed to the shield electrode ES, and is put in contact with the shield electrode ES via this projection. Alternatively, the metal frame FL may be put in direct contact with the shield electrode ES. In other words, the shield electrode ES and the metal frame FL are made electrically conductive on the outside of the display area DSP.

For example, the metal frame FL is grounded. Since the shield electrode ES is put in contact with the metal frame FL, which is set at the ground potential, via the projection, charge of the second optical element OD2 or counter-substrate CT, can be made to escape from the metal frame FL. Therefore, the charging of the counter-substrate CT can be suppressed, and the generation of a vertical electric field between the counter-substrate CT and the array substrate AR can be suppressed.

In Example 2, as shown in FIG. 5A and FIG. 5B, the shield electrode ES is formed to have a larger size than the display area DSP, and is so disposed as to cover the display area DSP. In addition, the shield electrode ES is formed to have a smaller size than the counter-substrate CT and is disposed, like the example shown in FIG. 1, so as to expose end portions along the four sizes of the counter-substrate CT on the outer surface of the counter-substrate CT. In addition, in Example 2, the counter-substrate CT has, on its outer surface, a terminal portion ESa which is electrically connected to the shield electrode ES. The terminal portion ESa may be formed of the same material as the shield electrode ES and may be formed integral with the shield electrode ES. Alternatively, the terminal portion ESa may be formed of a material that is different from the material of the shield electrode ES as a separate body from the shield electrode ES. The terminal portion ESa is led out to one side of the counter-substrate CT. According to this structure, the charge of the second optical element OD2 or counter-substrate CT can be made to escape via the terminal portion ESa.

In particular, in the example shown in FIG. 5A and FIG. 5B, the terminal portion ESa is led out to the side L2 of the counter-substrate CT. The extension portion ARa of the array substrate AR extends outward from the side L2 to which the terminal portion ESa is led out. In addition, the array substrate AR has a wiring line Z which is set at a ground potential. This wiring line Z is disposed on the extension portion ARa of the array substrate AR. The terminal portion ESa is electrically connected to the wiring line Z via an electrically conductive member 200, for instance, an electrically conductive paste or electrically conductive tape.

In short, since the shield electrode ES is connected to the wiring line Z, which is set at a ground potential, via the terminal portion ESa and electrically conductive member 200, the charge of the second optical element OD2 or counter-substrate CT can be made to escape via the wiring line Z. Therefore, the generation of a vertical electric field between the counter-substrate CT and the array substrate AR can be suppressed.

Next, a specific example of the manufacturing method of the liquid crystal display device is described.

To start with, a first mother-substrate for the array substrate AR and a second mother-substrate for the counter-substrate CT are prepared. The first mother-substrate has such an area as to enable formation of a plurality of array substrates AR. The second mother-substrate has such an area as to enable formation of a plurality of counter-substrates CT.

On one surface of the first mother-substrate, a mounting section 10 and a first display element section, which corresponds to the display area DSP, are formed in each array substrate formation area. Switching elements W, pixel electrodes EP and counter-electrode ET are formed on the first display element section.

On one surface of the second mother-substrate, a second display element section is formed in each counter-substrate formation area. A color filter 34 and a black matrix 32 are formed on the second display element section.

Then, on the other surface of the second mother-substrate (i.e. the surface opposite to the surface thereof on which the second display element section is formed), a shield electrode ES, which is opposed to the second display element section, is formed in each counter-substrate formation area. The shield electrode ES is formed by, e.g. a mask sputtering method in an island shape in an area that is opposed to the second display element section. Specifically, the shied electrode ES is formed in such a manner as not to overlap a cutting line along which the second mother-substrate is cut in a later cutting step. An example shown in FIG. 6 corresponds to Example 1, and the shield electrode ES is disposed within an area surrounded by two adjacent cutting lines A and cutting lines B1 and B2.

Subsequently, a sealant 300 is applied in a manner to surround the first display element section of the first mother-substrate or the second display element section of the second mother-substrate. The sealant 300 is disposed so as to secure the injection port 300A for injecting a liquid crystal material, in each liquid crystal display panel formation area. The injection port 300A is formed on a side different from the side on which the mounting section 10 is disposed. The sealant 300 is formed of a resin material such as a thermosetting resin.

Then, the first mother-substrate and the second mother-substrate are disposed such that the first display element section and the second display element section face each other. The first mother-substrate and the second mother-substrate, while being pressed in a direction of their attachment, are heated. Thereby, the sealant 300 is cured and the first mother-substrate and the second mother-substrate are bonded.

Figure 6:
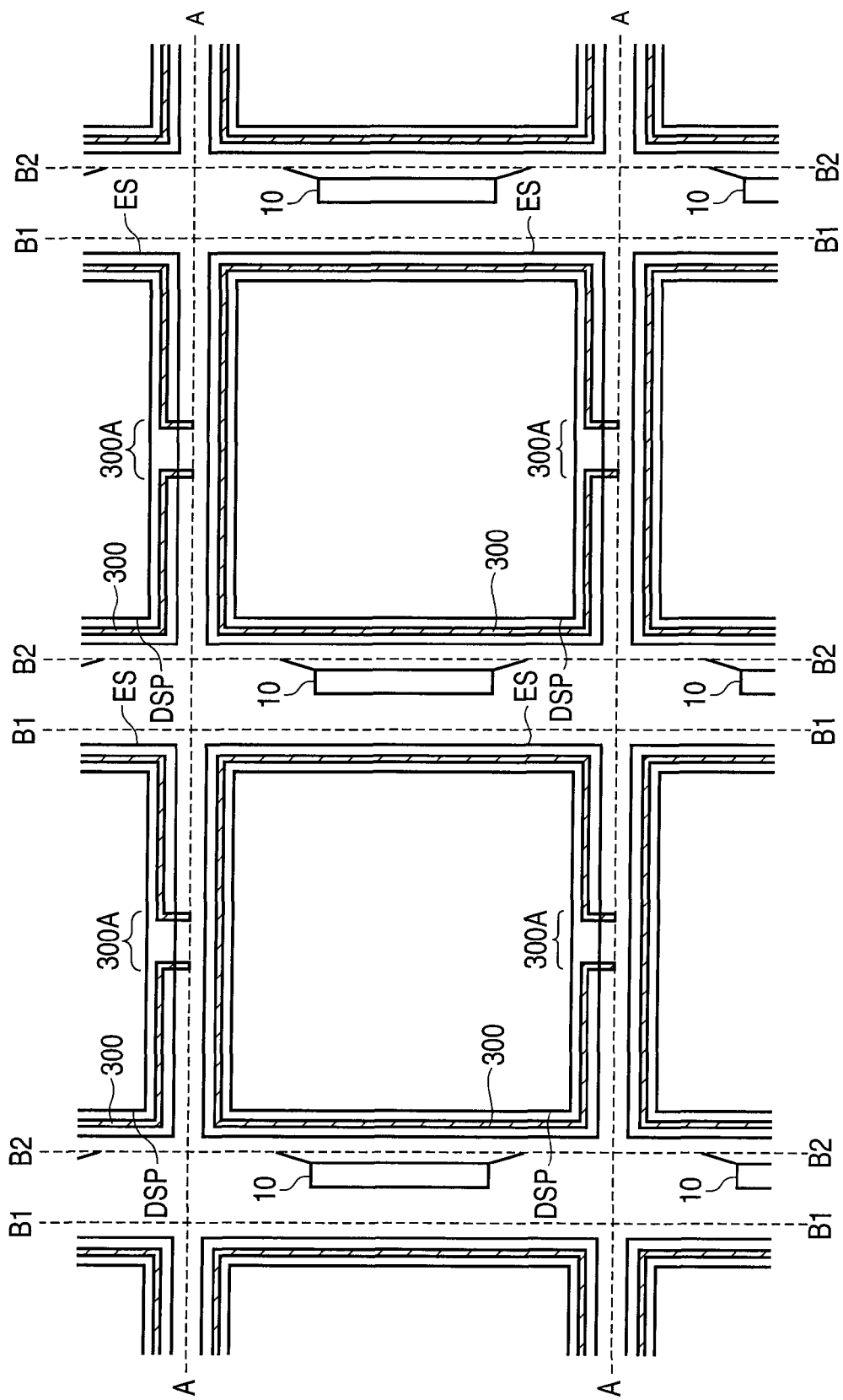
FIG. 6 is a view for describing a cutting step in a manufacturing method of the liquid crystal display device.

Thereafter, as shown in FIG. 6, the bonded mother-substrate pair is scribed along cutting lines A and is then cut in strips. Subsequently, a liquid crystal material is vacuum-injected from the injection port 300A. Following this, a photosensitive resin such as ultraviolet-curing resin, for instance, is applied to the injection port 300A as the end-sealing material 500, and the liquid crystal material is sealed by irradiating the photosensitive resin with ultraviolet. Then, the strip-shaped mother-substrate pair is scribed along cutting lines B1, and is then cut. Further, those areas of the second mother-substrate, which correspond to the mounting sections 10, are cut along cutting lines B2 and removed. Thereby, cells having exposed mounting sections 10 are formed.

By the above-described process, the liquid crystal display panel LPN having the liquid crystal layer LQ held between the array substrate AR and counter-substrate CT is formed.

As has been described above, the shield electrode ES is disposed so as not to overlap the cutting line A that overlaps the injection port 300A. In the example shown in FIG. 6, the shield electrode ES is disposed so as not to overlap any one of the cutting lines A, B1 and B2. In short, the shield electrode ES is disposed so as not to overlap at least the cutting line A along which the mother-substrate pair is cut prior to the liquid crystal injection step. Accordingly, a cutting member, such as a cutter, does not come in contact with the shield electrode ES when the mother-substrate pair is cut along the cutting line A.

Thus, when the mother-substrate pair is cut, the shield electrode ES is not chipped off, and no electrically conductive foreign matter occurs. Hence, in the liquid crystal material injection process, electrically conductive foreign matter can be prevented from mixing in the liquid crystal. Therefore, short-circuit between wiring lines and between electrodes in the liquid crystal layer can be prevented. Besides, an alignment defect of liquid crystal molecules due to mixing of foreign matter can be prevented.

As shown in FIG. 1, the shield electrode ES is disposed such that an end portion thereof along at least the side L1 of the counter-substrate CT where the injection port 300A is provided, is exposed on the outer surface of the counter-substrate CT. In other words, the shield electrode ES is provided so as not to reach the side L1 of the counter-substrate CT. By virtue of this shape of the shield electrode ES, the display quality of the display device can be improved and the manufacturing yield can be increased.

In addition, as described above, the shield electrode ES is disposed so as not to overlap the cutting line B2. Thus, when that area of the second mother-substrate, which is opposed to the mounting section 10, is cut along the cutting line B2, a cutter or the like does not come in contact with the shield electrode ES, and the shield electrode ES is not chipped off. Thereby, it is possible to prevent a peeled-off portion of the shield electrode ES from coming in contact with the mounting section 10. In short, contamination of the mounting section 10 can be prevented, and short-circuit on the mounting section 10 can be prevented.

Specifically, as shown in FIG. 1, the shield electrode ES is disposed such that an end portion thereof along at least the side L2 where the mounting section 10 is disposed, is exposed on the outer surface of the counter-substrate CT. In other words, the shield electrode ES is provided so as not to reach the side L2 of the counter-substrate CT. Thereby, the display quality of the display device can be improved and the manufacturing yield can be increased.

In the above-described example, the shield electrode ES is formed prior to bonding the first mother-substrate and second mother-substrate. However, even after the first mother-substrate and second mother-substrate are bonded, the shield electrode ES may be formed at a stage before the liquid crystal material is injected.

Figure 7:
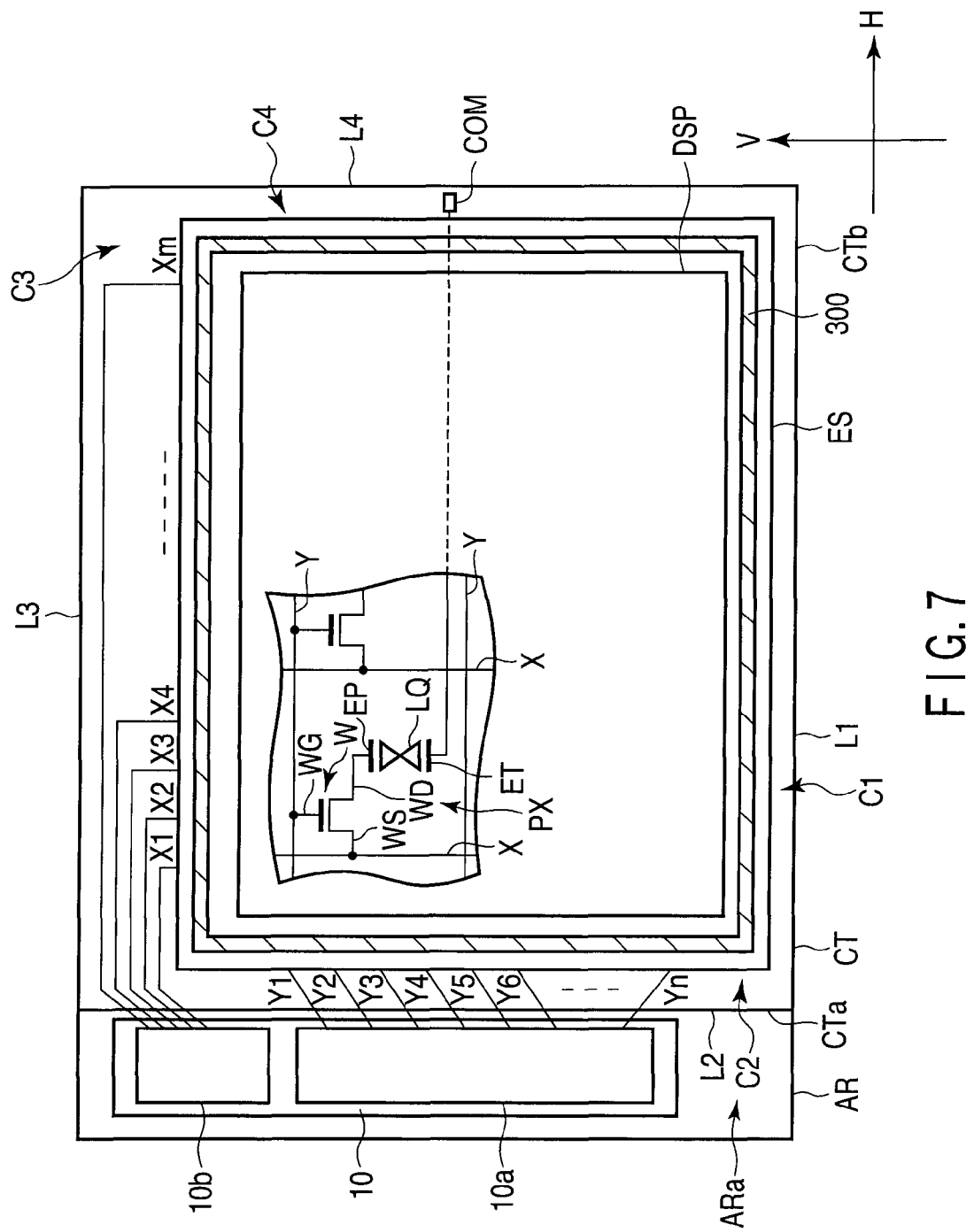
FIG. 7 schematically shows the structure of a liquid crystal display device of a liquid crystal mode which makes use of a transverse electric field according to another embodiment of the present invention.

In the above-described example of the manufacturing method, the liquid crystal material is vacuum-injected after the first mother-substrate and second mother-substrate are attached. However, the method is not limited to this example. Another example of the manufacturing method, in which the liquid crystal material is injected by a dispenser method, is described below. As is shown in FIG. 7, a liquid crystal display panel, to which the dispenser method is applied, is characterized in that the sealant 300, by which the array substrate AR and the counter-substrate CT are bonded, is formed in a loop shape surrounding the display area DSP.

This liquid crystal display panel is manufactured by the following process.

Figure 8:
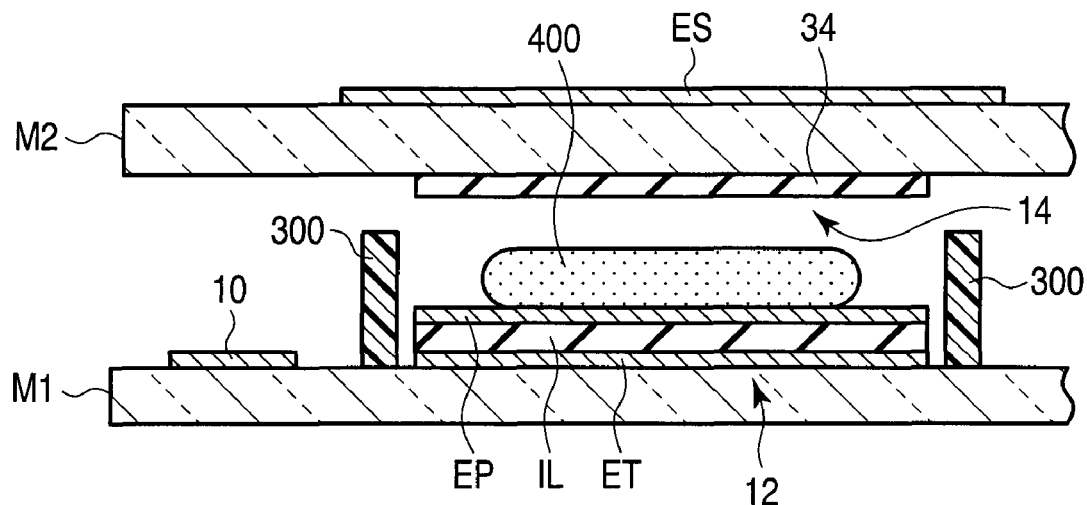
FIG. 8 is a view for describing a manufacturing method in a case where a liquid crystal material is injected by a dispenser method, FIG. 8 specifically illustrating a step of dispensing the liquid crystal material.

To start with, as shown in FIG. 8, by the same procedure as in the case of vacuum-injecting the liquid crystal material, a first mother-substrate M1 for the array substrate AR and a second mother-substrate M2 for the counter-substrate CT are prepared. Specifically, on one surface of the first mother-substrate M1, a mounting section 10 and a first display element section 12, which corresponds to the display area DSP, are formed in each array substrate formation area. On one surface of the second mother-substrate M2, a second display element section 14 is formed in each counter-substrate formation area.

Then, on the other surface of the second mother-substrate M2, a shield electrode ES, which is opposed to the second display element section 14, is formed in each counter-substrate formation area. In particular, the shied electrode ES is formed in such a manner as not to overlap a cutting line along which the second mother-substrate M2 is cut in a later cutting step.

Subsequently, a sealant 300 is applied in a loop shape in a manner to surround the first display element section 12 of the first mother-substrate M1 or the second display element section 14 of the second mother-substrate M2.

Then, a liquid crystal material 400 is dispensed in an inside area surrounded by the sealant 300.

Thereafter, the first mother-substrate M1 and the second mother-substrate M2 are disposed such that the first display element section 12 and the second display element section 14 face each other.

Figure 9:
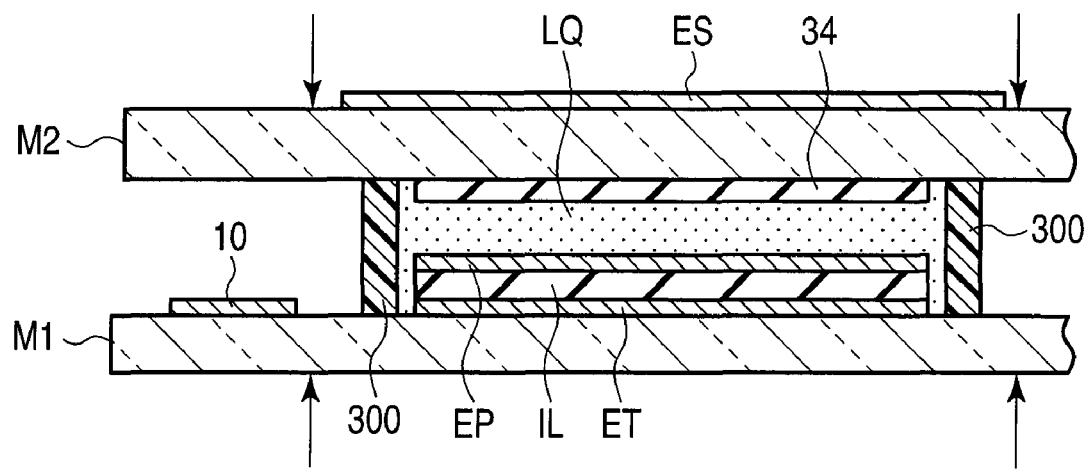
FIG. 9 is a view for describing a step of bonding a first mother-substrate and a second mother-substrate.
Figure 12:
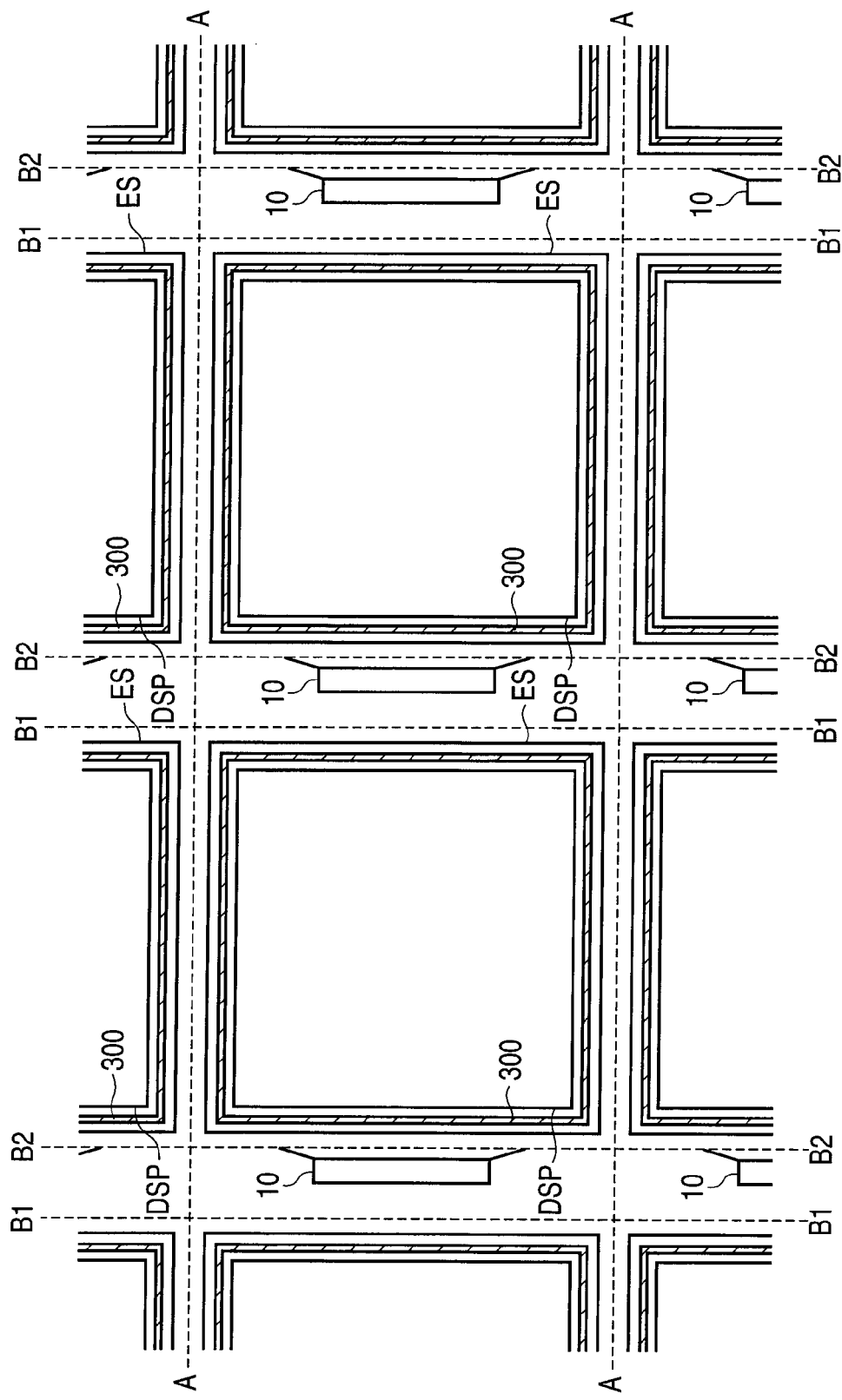
FIG. 12 is a view for describing a cutting step in the manufacturing method of the liquid crystal display device.

As shown in FIG. 9, the first mother-substrate M1 and the second mother-substrate M2, while being pressed in a direction in which they are attached, are heated. Thereby, the first mother-substrate M1 and the second mother-substrate M2 are bonded. FIG. 12 is a plan view of the bonded mother-substrate pair.

The bonded mother-substrate pair is cut along the cutting lines A, B1 and B2. In particular, as shown in FIG. 10, in a step of removing a region MX of the second mother-substrate M2, which is opposed to the mounting section 10, a scribe line is formed by a scribe member along a cutting line B2. A shock is applied by using, e.g. a break bar, thereby causing a crack to extend, and the second mother-substrate M2 is cut along the cutting line B2. Thereby, the region MX is removed and, as shown in FIG. 11, a liquid crystal display panel LPN having a liquid crystal layer LQ held between the array substrate AR and counter-substrate CT is fabricated.

As has been described above, like the case of vacuum-injecting the liquid crystal material 400, the shield electrode ES is disposed so as not to overlap the cutting line B2. Therefore, in the step of cutting along the cutting line B2, the shield electrode ES is not chipped off, and no contamination occurs due to electrically conductive foreign matter. In other words, contamination of the mounting section 10 can be prevented, and short-circuit on the mounting section 10 can be prevented. Hence, the display quality of the display device can be improved and the manufacturing yield can be increased.

Since the liquid crystal material 400 is dispensed and the liquid crystal layer LQ is formed before the first mother-substrate M1 and second mother-substrate M2 are attached, the manufacturing time can be shortened.

In particular, as shown in FIG. 6 and FIG. 12, by disposing the shield electrode ES so as not to overlap any one of the cutting lines A, B1 and B2, the shield electrode ES is not chipped off in the step of cutting along all cutting lines, and no electrically conductive foreign matter occurs. Therefore, it is possible to suppress adherence of electrically conductive foreign matter to each liquid crystal display panel LPN and contamination of a surrounding manufacturing environment.

As has been described above, according to the present embodiment, the liquid crystal display device can prevent a decrease in manufacturing yield of display devices, while preventing charging of the counter-substrate CT.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In the case of vacuum-injecting the liquid crystal material 400, it should suffice if the shield electrode ES is disposed such that at least an end portion CTb thereof along the side L1 where the injection port 300A is provided, is exposed. In other words, it should suffice if a distance is provided between the periphery of the shield electrode ES and the side L1 of the counter-substrate CT, and the periphery of the shield electrode ES is disposed so as to cross the injection port 300A. In addition, in the case of the structure in which the mounting section 10 is provided on the extension portion ARa of the array substrate AR, it should suffice if the shield electrode ES is disposed with a distance such that at least an end portion C2 thereof along the side L2 where the mounting section 10 is disposed, is exposed. Preferably, the shield electrode ES should be disposed such that their end portions C1, C2, C3 and C4 along the four sides L1, L2, L3 and L4 of the counter-substrate CT, are exposed. In other word, it should suffice if the shield electrode ES covers the entire surface of the display area DSP, and the area of the shield electrode ES is smaller than the area of the counter-substrate CT and is larger than the area of the display area DSP.

In Example 1, the shield electrode ES is formed to have a larger size than the display area DSP so that the shield electrode ES has a contact with the metal frame FL on the outside of the display area DSP. In Example 2, since the shield electrode ES is connected to the terminal portion ESa which is led out to the end side of the counter-substrate CT, the shield electrode ES may be formed to have substantially the same size as the display area DSP. By forming the shield electrode ES in this manner, a large distance can be secured between the shield electrode ES and the cutting line A, B1 and B2 (i.e. the distance from the shield electrode to the end side of the counter-substrate). Accordingly, in the step of cutting along the cutting line, the occurrence of contact between the cutting member and the shield electrode ES can further be suppressed. Furthermore, since the shield electrode ES can be formed with a small size, the amount of consumed material can be decreased, and the manufacturing cost can be reduced.

In the above-described embodiments, the FFS mode, in which liquid crystal molecules are switched by making use of a transverse electric field, has been described as an example of the liquid crystal mode. However, the invention is not limited to these embodiments and is applicable to other liquid crystal modes which require, as an electrostatic measure, the disposition of a shield electrode on the outer surface of the counter-substrate, for instance, a liquid crystal mode in which crystal molecules are switched by making use of a vertical electric field, such as a TN (Twisted Nematic) mode or a multi-domain VA (Vertical Alignment) mode in which slits are formed in the counter-electrode.

What is claimed is:

1. A method of manufacturing a liquid crystal display device comprising an array substrate, a counter substrate which is disposed to oppose the array substrate, and a liquid crystal layer held between the array and counter substrates, the method comprising:
   providing a first mother substrate having a plurality of array substrates, each of the array substrates comprising:
      a display element section having a plurality of pixel electrodes and a counter electrode, and
      a mounting section located outside of the display element section,
   providing a second mother substrate having a plurality of counter substrates corresponding to the array substrates and having a first side facing the liquid crystal layer;
   bonding the first and second mother substrates via a sealant;
   forming a plurality of shield electrodes on an outer surface of the second mother substrate, the outer surface being on a second side of the second mother substrate, the second side being opposite the first side; and
   cutting a portion of the outer surface not covered by the shield electrodes, and removing a region of the second mother substrate, the region being opposed to the mounting section, to form the liquid crystal display device.

2. The method of claim 1, wherein the shield electrodes are formed by a mask sputtering process.

3. The method of claim 1, wherein the display element section further comprises a switching element.

4. The method of claim 1, wherein one of the shield electrodes comprises a terminal portion led out to one side of the counter substrate.

5. The method of claim 4, wherein at least one of the array substrates comprises a ground potential wiring line, and
   the method further comprises electrically connecting the terminal portion of the shield electrode to the ground potential wiring line, after the cutting.

6. The method of claim 1, further comprising electrically connecting a terminal portion of the shield electrodes to a metal frame after the cutting.

* * * * *